(12) United States Patent
Prabhu

(10) Patent No.: US 9,587,564 B2
(45) Date of Patent: Mar. 7, 2017

(54) FUEL OXIDATION IN A GAS TURBINE SYSTEM

(71) Applicant: ENER-CORE POWER, INC., Irvine, CA (US)

(72) Inventor: Edan Prabhu, Mission Viejo, CA (US)

(73) Assignee: ENER-CORE POWER, INC., Irvine, CA (US)

(*) Notice: Subject to any disclaimer, the term of this patent is extended or adjusted under 35 U.S.C. 154(b) by 112 days.

(21) Appl. No.: 14/217,106

(22) Filed: Mar. 17, 2014

(65) Prior Publication Data

US 2014/0196467 A1 Jul. 17, 2014

Related U.S. Application Data

(63) Continuation of application No. 12/050,734, filed on Mar. 18, 2008, now Pat. No. 8,671,658.

(Continued)

(51) Int. Cl.
  *F02C 9/28* (2006.01)
  *F02C 3/20* (2006.01)
  (Continued)

(52) U.S. Cl.
  CPC ............... *F02C 9/28* (2013.01); *F02C 3/205* (2013.01); *F02C 3/22* (2013.01); *F23C 99/006* (2013.01); *F23R 3/26* (2013.01); *F23R 3/28* (2013.01); *F23C 2900/99001* (2013.01); *Y02E 20/342* (2013.01)

(58) Field of Classification Search
  CPC ...... F02C 9/26; F02C 9/28; F02C 3/22; F02C 3/205; F23C 99/006; F23C 2900/99001; F23R 3/26; F23R 3/28; F23R 3/36

USPC .......... 60/775, 776, 777, 39.281, 39.3, 800, 60/39.463, 733, 39.53
  See application file for complete search history.

(56) References Cited

U.S. PATENT DOCUMENTS 2,303,381 A 12/1942 New
2,433,932 A 1/1948 Stosick
(Continued)

FOREIGN PATENT DOCUMENTS

CH 319366 A 2/1957
DE 102004005477 A1 8/2004
(Continued)

OTHER PUBLICATIONS

Wünning, "Flameless Combustion and its Applications," <http://www.bine.info/fileadmin/content/Publikationen/Projekt-Infos/Zusatzinfos/2006-07_Flameless_Combustion.pdf>, Jul. 2007.

(Continued)

*Primary Examiner* — Steven Sutherland
(74) *Attorney, Agent, or Firm* — McDermott Will & Emery LLP

(57) ABSTRACT

A mixture of air and fuel is received into a reaction chamber of a gas turbine system. The fuel is oxidized in the reaction chamber, and a maximum temperature of the mixture in the reaction chamber is controlled to be substantially at or below an inlet temperature of a turbine of the gas turbine system. The oxidation of the fuel is initiated by raising the temperature of the mixture to or above an auto-ignition temperature of the fuel. In some cases, the reaction chamber may be provided without a fuel oxidation catalyst material.

25 Claims, 4 Drawing Sheets

Related U.S. Application Data

(60) Provisional application No. 61/007,917, filed on Oct. 23, 2007.

(51) Int. Cl.

| | | |
|---|---|---|
| *F02C 3/22* | (2006.01) | |
| *F23C 99/00* | (2006.01) | |
| *F23R 3/26* | (2006.01) | |
| *F23R 3/28* | (2006.01) | |

(56) References Cited

U.S. PATENT DOCUMENTS

| | | |
|---|---|---|
| 2,443,841 A | 6/1948 | Sweeney |
| 2,624,172 A | 1/1953 | Houdry |
| 2,630,678 A | 3/1953 | Pratt |
| 2,655,786 A | 10/1953 | Carr |
| 2,793,497 A | 5/1957 | Hellmuth |
| 2,795,054 A | 6/1957 | Bowen, III |
| 3,313,103 A | 4/1967 | Johnson |
| 3,661,497 A | 5/1972 | Castellucci et al. |
| 3,731,485 A | 5/1973 | Rudolph et al. |
| 3,732,911 A | 5/1973 | Lowe et al. |
| 3,769,922 A | 11/1973 | Furlong et al. |
| 3,790,350 A | 2/1974 | Haensel |
| 3,797,231 A | 3/1974 | McLean |
| 3,810,732 A | 5/1974 | Koch |
| 3,846,979 A | 11/1974 | Pfefferle |
| 3,928,961 A | 12/1975 | Pfefferle |
| 3,942,264 A | 3/1976 | Zenkner |
| 3,943,705 A | 3/1976 | DeCorso et al. |
| 3,975,900 A | 8/1976 | Pfefferle |
| 4,052,143 A | 10/1977 | Sandviknes |
| 4,111,644 A | 9/1978 | Buckholdt |
| 4,116,005 A | 9/1978 | Willyoung |
| 4,125,359 A | 11/1978 | Lempa |
| 4,163,366 A | 8/1979 | Kent |
| 4,187,672 A | 2/1980 | Rasor |
| 4,192,642 A | 3/1980 | Lempa |
| 4,202,168 A | 5/1980 | Acheson et al. |
| 4,202,169 A | 5/1980 | Acheson et al. |
| 4,209,303 A | 6/1980 | Ricks |
| 4,221,558 A | 9/1980 | Santisi |
| 4,239,481 A | 12/1980 | Morck, Jr. |
| 4,252,070 A | 2/1981 | Benedick |
| 4,289,475 A | 9/1981 | Wall et al. |
| 4,321,790 A | 3/1982 | Vadas et al. |
| 4,361,478 A | 11/1982 | Gengler et al. |
| 4,379,689 A | 4/1983 | Morck, Jr. |
| 4,400,356 A | 8/1983 | McVay et al. |
| 4,403,941 A | 9/1983 | Okiura et al. |
| 4,416,620 A | 11/1983 | Morck |
| 4,418,530 A | 12/1983 | Bodrov et al. |
| 4,442,901 A | 4/1984 | Zison |
| 4,447,690 A | 5/1984 | Grever |
| 4,449,918 A | 5/1984 | Spahr |
| 4,467,610 A | 8/1984 | Pearson et al. |
| 4,469,176 A | 9/1984 | Zison et al. |
| 4,472,935 A | 9/1984 | Acheson et al. |
| 4,487,573 A | 12/1984 | Gottschlich et al. |
| 4,493,770 A | 1/1985 | Moilliet |
| 4,509,333 A | 4/1985 | Nussdorfer et al. |
| 4,509,374 A | 4/1985 | Sugimoto et al. |
| 4,534,165 A | 8/1985 | Davis, Jr. et al. |
| 4,643,667 A | 2/1987 | Fleming |
| 4,646,660 A | 3/1987 | Bjorkman et al. |
| 4,681,612 A | 7/1987 | O'Brien et al. |
| 4,688,495 A | 8/1987 | Galloway |
| 4,731,989 A | 3/1988 | Furuya et al. |
| 4,733,528 A | 3/1988 | Pinto |
| 4,741,690 A | 5/1988 | Heed |
| 4,754,607 A | 7/1988 | Mackay |
| 4,769,149 A | 9/1988 | Nobilet et al. |
| 4,779,545 A | 10/1988 | Breen et al. |
| 4,794,753 A | 1/1989 | Beebe |
| 4,823,711 A | 4/1989 | Kroneberger et al. |
| 4,828,481 A | 5/1989 | Weil et al. |
| 4,838,020 A | 6/1989 | Fujitsuka |
| 4,838,782 A | 6/1989 | Wills |
| 4,841,722 A | 6/1989 | Bjorge |
| 4,850,857 A | 7/1989 | Obermuller |
| 4,864,811 A | 9/1989 | Pfefferle |
| 4,870,824 A | 10/1989 | Young et al. |
| 4,874,310 A | 10/1989 | Seemann et al. |
| 4,888,162 A | 12/1989 | Brian |
| 4,941,415 A | 7/1990 | Pope et al. |
| 4,953,512 A | 9/1990 | Italiano |
| 4,974,530 A | 12/1990 | Lyon |
| 5,000,004 A | 3/1991 | Yamanaka et al. |
| 5,003,773 A | 4/1991 | Beckwith |
| 5,044,931 A | 9/1991 | Van Eerden et al. |
| 5,059,405 A | 10/1991 | Watson et al. |
| 5,108,717 A | 4/1992 | Deller et al. |
| 5,131,838 A | 7/1992 | Gensler et al. |
| 5,154,599 A | 10/1992 | Wunning |
| 5,161,366 A | 11/1992 | Beebe |
| 5,165,884 A | 11/1992 | Martin et al. |
| 5,183,401 A | 2/1993 | Dalla Betta et al. |
| 5,190,453 A | 3/1993 | Le et al. |
| 5,203,796 A * | 4/1993 | Washam ............ F23R 3/20 60/737 |
| 5,225,575 A | 7/1993 | Ivanov et al. |
| 5,232,357 A | 8/1993 | Dalla Betta et al. |
| 5,248,251 A | 9/1993 | Dalla Betta et al. |
| 5,250,489 A | 10/1993 | Dalla Betta et al. |
| 5,258,349 A | 11/1993 | Dalla Betta et al. |
| 5,259,754 A | 11/1993 | Dalla Betta et al. |
| 5,263,314 A | 11/1993 | Anderson |
| 5,271,729 A | 12/1993 | Gensler et al. |
| 5,271,809 A | 12/1993 | Holzhausen |
| 5,281,128 A | 1/1994 | Dalla Betta et al. |
| 5,285,123 A | 2/1994 | Kataoka et al. |
| 5,309,707 A | 5/1994 | Provol et al. |
| 5,320,518 A | 6/1994 | Stilger et al. |
| 5,326,253 A | 7/1994 | Dalla Betta et al. |
| 5,326,537 A | 7/1994 | Cleary |
| 5,329,757 A | 7/1994 | Faulkner et al. |
| 5,329,955 A | 7/1994 | Gensler et al. |
| 5,375,563 A | 12/1994 | Khinkis et al. |
| 5,384,051 A | 1/1995 | McGinness |
| 5,405,260 A | 4/1995 | Della Betta et al. |
| 5,406,704 A | 4/1995 | Retallick |
| 5,425,632 A | 6/1995 | Tsurumi et al. |
| 5,461,864 A | 10/1995 | Betta et al. |
| 5,490,376 A | 2/1996 | Van Der Burgt |
| 5,506,363 A | 4/1996 | Grate et al. |
| 5,511,972 A | 4/1996 | Dalla Betta et al. |
| 5,512,250 A | 4/1996 | Betta et al. |
| 5,518,697 A | 5/1996 | Dalla Betta et al. |
| 5,524,432 A | 6/1996 | Hansel |
| 5,524,599 A | 6/1996 | Kong et al. |
| 5,533,890 A | 7/1996 | Holst et al. |
| 5,557,014 A | 9/1996 | Grate et al. |
| 5,560,128 A | 10/1996 | Marega et al. |
| 5,592,811 A | 1/1997 | Dodge et al. |
| 5,601,790 A | 2/1997 | Stilger et al. |
| 5,602,298 A | 2/1997 | Levin |
| 5,626,017 A | 5/1997 | Sattelmayer |
| 5,635,139 A | 6/1997 | Holst et al. |
| 5,637,283 A | 6/1997 | Stilger et al. |
| 5,650,128 A | 7/1997 | Holst et al. |
| 5,685,156 A | 11/1997 | Willis et al. |
| 5,697,776 A | 12/1997 | Van Eerden et al. |
| 5,709,541 A | 1/1998 | Gensler et al. |
| 5,729,967 A | 3/1998 | Joos et al. |
| 5,770,584 A | 6/1998 | Kucera et al. |
| 5,770,784 A | 6/1998 | Heywood et al. |
| 5,794,431 A | 8/1998 | Utamura et al. |
| 5,806,298 A | 9/1998 | Klosek et al. |
| 5,816,705 A | 10/1998 | Vander Heyden et al. |
| 5,817,286 A | 10/1998 | Martin et al. |
| 5,819,524 A | 10/1998 | Bosley et al. |
| 5,819,673 A | 10/1998 | Heywood et al. |
| 5,832,713 A | 11/1998 | Maese et al. |

(56) References Cited

U.S. PATENT DOCUMENTS

| | | |
|---|---|---|
| 5,842,357 A | 12/1998 | Siwajek et al. |
| 5,850,731 A | 12/1998 | Beebe et al. |
| 5,850,733 A | 12/1998 | Bosley et al. |
| 5,857,419 A | 1/1999 | Van Eerden et al. |
| 5,862,858 A | 1/1999 | Wellington et al. |
| 5,895,599 A | 4/1999 | Nivoche |
| 5,896,740 A | 4/1999 | Shouman |
| 5,921,763 A | 7/1999 | Martin |
| 5,944,503 A | 8/1999 | Van Eerden et al. |
| 5,987,875 A | 11/1999 | Hilburn et al. |
| 6,000,930 A | 12/1999 | Kelly et al. |
| 6,015,540 A | 1/2000 | McAdams et al. |
| 6,017,172 A | 1/2000 | Ukegawa et al. |
| 6,019,172 A | 2/2000 | Wellington et al. |
| 6,033,207 A | 3/2000 | Cummings |
| 6,053,699 A | 4/2000 | Turnquist et al. |
| 6,070,404 A | 6/2000 | Bosley et al. |
| 6,071,114 A | 6/2000 | Cusack et al. |
| 6,095,793 A | 8/2000 | Greeb |
| 6,098,396 A | 8/2000 | Wen et al. |
| 6,107,693 A | 8/2000 | Mongia et al. |
| 6,109,018 A | 8/2000 | Rostrup-Nielsen et al. |
| 6,116,014 A | 9/2000 | Dalla Betta et al. |
| 6,126,913 A | 10/2000 | Martin et al. |
| 6,136,144 A | 10/2000 | Martin et al. |
| 6,141,953 A | 11/2000 | Mongia et al. |
| 6,158,222 A | 12/2000 | Retallick |
| 6,164,908 A | 12/2000 | Nishida et al. |
| 6,205,768 B1 | 3/2001 | Dibble et al. |
| 6,217,832 B1 | 4/2001 | Betta et al. |
| 6,226,976 B1 | 5/2001 | Scott et al. |
| 6,251,347 B1 | 6/2001 | Campbell et al. |
| 6,257,869 B1 | 7/2001 | Martin et al. |
| 6,261,093 B1 | 7/2001 | Matros et al. |
| 6,269,882 B1 | 8/2001 | Wellington et al. |
| 6,289,666 B1 * | 9/2001 | Ginter .................. F01D 25/285 60/39.55 |
| 6,313,544 B1 | 11/2001 | Mongia et al. |
| 6,334,769 B1 | 1/2002 | Retallick et al. |
| 6,339,924 B1 | 1/2002 | Hoyer et al. |
| 6,339,925 B1 | 1/2002 | Hung et al. |
| 6,345,495 B1 | 2/2002 | Cummings |
| 6,383,462 B1 | 5/2002 | Lang |
| 6,391,267 B1 | 5/2002 | Martin et al. |
| 6,393,727 B1 | 5/2002 | Seelig et al. |
| 6,393,821 B1 | 5/2002 | Prabhu |
| 6,469,181 B1 | 10/2002 | Gruber et al. |
| 6,485,289 B1 | 11/2002 | Kelly et al. |
| 6,487,860 B2 | 12/2002 | Mayersky et al. |
| 6,497,615 B1 | 12/2002 | Klager |
| 6,514,472 B2 | 2/2003 | Menacherry et al. |
| 6,521,566 B1 | 2/2003 | Magno et al. |
| 6,539,720 B2 | 4/2003 | Rouse et al. |
| 6,551,068 B2 | 4/2003 | Blotenberg |
| 6,595,001 B2 | 7/2003 | Rautenbach et al. |
| 6,595,003 B2 | 7/2003 | Dalla Betta et al. |
| 6,612,112 B2 | 9/2003 | Gilbreth et al. |
| 6,634,176 B2 | 10/2003 | Rouse et al. |
| 6,639,328 B2 | 10/2003 | Wacknov |
| 6,641,625 B1 | 11/2003 | Clawson et al. |
| 6,655,137 B1 | 12/2003 | Sardari |
| 6,657,332 B2 | 12/2003 | Balas |
| 6,657,348 B2 | 12/2003 | Qin et al. |
| 6,675,583 B2 | 1/2004 | Willis et al. |
| 6,696,130 B1 | 2/2004 | Kasai et al. |
| 6,698,412 B2 | 3/2004 | Dalla Betta |
| 6,715,296 B2 | 4/2004 | Bakran et al. |
| 6,718,772 B2 | 4/2004 | Dalla Betta et al. |
| 6,720,685 B2 | 4/2004 | Balas |
| 6,732,531 B2 | 5/2004 | Dickey |
| 6,747,372 B2 | 6/2004 | Gilbreth et al. |
| 6,748,742 B2 | 6/2004 | Rouse et al. |
| 6,751,941 B2 | 6/2004 | Edelman et al. |
| 6,784,565 B2 | 8/2004 | Wall et al. |
| 6,787,933 B2 | 9/2004 | Claude et al. |
| 6,796,129 B2 | 9/2004 | Yee et al. |
| 6,796,789 B1 | 9/2004 | Gibson et al. |
| 6,804,946 B2 | 10/2004 | Willis et al. |
| 6,810,678 B1 | 11/2004 | Luk |
| 6,812,586 B2 | 11/2004 | Wacknov et al. |
| 6,812,587 B2 | 11/2004 | Gilbreth et al. |
| 6,815,932 B2 | 11/2004 | Wall |
| 6,824,328 B1 | 11/2004 | Vinegar et al. |
| 6,832,480 B1 | 12/2004 | Anguil |
| 6,864,595 B2 | 3/2005 | Wall |
| 6,892,542 B2 | 5/2005 | Voinov |
| 6,895,760 B2 | 5/2005 | Kesseli |
| RE38,784 E | 8/2005 | Maese et al. |
| 6,923,001 B2 | 8/2005 | Laster et al. |
| RE38,815 E | 10/2005 | Maese et al. |
| 6,951,110 B2 | 10/2005 | Kang |
| 6,960,840 B2 | 11/2005 | Willis et al. |
| 6,962,055 B2 | 11/2005 | Chen et al. |
| 7,007,486 B2 | 3/2006 | Sprouse et al. |
| 7,007,487 B2 | 3/2006 | Belokon et al. |
| 7,017,329 B2 | 3/2006 | Farhangi et al. |
| 7,045,913 B2 | 5/2006 | Ebrahim et al. |
| 7,053,590 B2 | 5/2006 | Wang |
| 7,062,917 B2 | 6/2006 | Wunning et al. |
| 7,093,445 B2 | 8/2006 | Corr, II et al. |
| 7,096,671 B2 | 8/2006 | Bland et al. |
| 7,117,676 B2 | 10/2006 | Farhangi et al. |
| 7,117,694 B2 | 10/2006 | Braun et al. |
| 7,121,097 B2 | 10/2006 | Yee et al. |
| 7,124,589 B2 | 10/2006 | Neary |
| 7,140,188 B2 | 11/2006 | Hosokawa et al. |
| 7,168,949 B2 | 1/2007 | Zinn et al. |
| RE39,596 E | 5/2007 | Dodge et al. |
| 7,305,825 B2 | 12/2007 | Ruiz et al. |
| 7,353,655 B2 | 4/2008 | Bolis et al. |
| 7,378,065 B2 | 5/2008 | Filippi et al. |
| 7,425,127 B2 | 9/2008 | Zinn et al. |
| 7,430,869 B2 | 10/2008 | Su et al. |
| 7,469,647 B2 | 12/2008 | Widmer et al. |
| 7,624,564 B2 | 12/2009 | Stuttaford et al. |
| 7,703,271 B2 | 4/2010 | Minkkinen et al. |
| 7,823,388 B2 | 11/2010 | Murakami |
| 8,671,917 B2 | 3/2014 | Schnepel |
| 2002/0015670 A1 | 2/2002 | Shah et al. |
| 2002/0060556 A1 | 5/2002 | Wall |
| 2002/0063479 A1 | 5/2002 | Mitchell et al. |
| 2002/0066270 A1 | 6/2002 | Rouse et al. |
| 2002/0067872 A1 | 6/2002 | Weissert |
| 2002/0069648 A1 | 6/2002 | Levy et al. |
| 2002/0078694 A1 | 6/2002 | Nazeer et al. |
| 2002/0079760 A1 | 6/2002 | Vessa |
| 2002/0084702 A1 | 7/2002 | Balas |
| 2002/0096393 A1 | 7/2002 | Rouse |
| 2002/0096959 A1 | 7/2002 | Qin et al. |
| 2002/0097928 A1 | 7/2002 | Swinton et al. |
| 2002/0104316 A1 | 8/2002 | Dickey et al. |
| 2002/0125779 A1 | 9/2002 | Qin et al. |
| 2002/0128076 A1 | 9/2002 | Lubell |
| 2002/0166324 A1 | 11/2002 | Willis et al. |
| 2002/0195031 A1 | 12/2002 | Walker |
| 2003/0102730 A1 | 6/2003 | Balas |
| 2003/0110773 A1 | 6/2003 | Rouse et al. |
| 2003/0111842 A1 | 6/2003 | Gilbreth et al. |
| 2003/0157395 A1 | 8/2003 | Ren et al. |
| 2003/0192318 A1 | 10/2003 | Sprouse et al. |
| 2003/0192319 A1 | 10/2003 | Sprouse et al. |
| 2004/0003598 A1 | 1/2004 | Farhangi |
| 2004/0011523 A1 | 1/2004 | Sarada |
| 2004/0021235 A1 | 2/2004 | Corr et al. |
| 2004/0040312 A1 | 3/2004 | Hoffjann et al. |
| 2004/0074223 A1 | 4/2004 | Willis et al. |
| 2004/0100101 A1 | 5/2004 | Willis et al. |
| 2004/0103669 A1 | 6/2004 | Willis et al. |
| 2004/0119291 A1 | 6/2004 | Hamrin et al. |
| 2004/0129188 A1 | 7/2004 | Traina |
| 2004/0148942 A1 | 8/2004 | Pont et al. |
| 2004/0160061 A1 | 8/2004 | Rouse et al. |
| 2004/0167270 A1 | 8/2004 | Chang et al. |
| 2004/0178641 A1 | 9/2004 | Wall |

(56) References Cited

U.S. PATENT DOCUMENTS

| | | |
|---|---|---|
| 2004/0206090 A1 | 10/2004 | Yee et al. |
| 2004/0219079 A1 | 11/2004 | Hagen et al. |
| 2004/0238654 A1 | 12/2004 | Hagen et al. |
| 2004/0255588 A1 | 12/2004 | Lundberg et al. |
| 2005/0022499 A1 | 2/2005 | Belokon et al. |
| 2005/0028530 A1 | 2/2005 | Doebbeling et al. |
| 2005/0076648 A1 | 4/2005 | Farhangi |
| 2005/0196714 A1 | 9/2005 | Carroni et al. |
| 2005/0201909 A1 | 9/2005 | Carroni et al. |
| 2005/0217178 A1 | 10/2005 | Aoyama |
| 2006/0016195 A1 | 1/2006 | Dalla Betta et al. |
| 2006/0037432 A1 | 2/2006 | Deevi et al. |
| 2006/0049080 A1 | 3/2006 | Bacha et al. |
| 2006/0052499 A1 | 3/2006 | Chang et al. |
| 2006/0054318 A1 | 3/2006 | Sarada |
| 2006/0063845 A1 | 3/2006 | O'Rear et al. |
| 2006/0063869 A1 | 3/2006 | Chang et al. |
| 2006/0063870 A1 | 3/2006 | Chang et al. |
| 2006/0074134 A1 | 4/2006 | O'Rear et al. |
| 2006/0080968 A1 | 4/2006 | Griffin et al. |
| 2006/0096294 A1 | 5/2006 | Farhangi et al. |
| 2006/0096297 A1 | 5/2006 | Griffin et al. |
| 2006/0138022 A1 | 6/2006 | Miller et al. |
| 2006/0138024 A1 | 6/2006 | Miller et al. |
| 2006/0150635 A1 | 7/2006 | Su et al. |
| 2006/0196807 A1 | 9/2006 | Rosenbaum et al. |
| 2006/0199743 A1 | 9/2006 | Rosenbaum et al. |
| 2006/0202059 A1 | 9/2006 | Carroni et al. |
| 2006/0213183 A1 | 9/2006 | Althaus |
| 2006/0260308 A1 | 11/2006 | Ingersoll |
| 2006/0272331 A1 | 12/2006 | Bucker et al. |
| 2007/0022758 A1 | 2/2007 | Myers et al. |
| 2007/0054226 A1 | 3/2007 | Carroni et al. |
| 2007/0180832 A1* | 8/2007 | Kenyon .................. F02K 7/02 60/776 |
| 2007/0240425 A1 | 10/2007 | Malavasi et al. |
| 2007/0261408 A1 | 11/2007 | Carrea et al. |
| 2008/0115502 A1 | 5/2008 | Roby et al. |
| 2008/0222913 A1 | 9/2008 | Ronning et al. |
| 2008/0256938 A1 | 10/2008 | Miretti |
| 2009/0100820 A1 | 4/2009 | Prabhu |
| 2009/0100821 A1 | 4/2009 | Prabhu |
| 2009/0136406 A1 | 5/2009 | Johnson et al. |
| 2009/0272097 A1 | 11/2009 | Lawson et al. |
| 2009/0272118 A1 | 11/2009 | Alexander et al. |
| 2009/0277182 A1 | 11/2009 | Engelbrecht et al. |
| 2010/0062381 A1 | 3/2010 | Gross et al. |
| 2010/0092898 A1 | 4/2010 | Dahl et al. |
| 2010/0139282 A1 | 6/2010 | Prabhu |
| 2010/0233642 A1 | 9/2010 | Mozzi et al. |
| 2010/0275611 A1 | 11/2010 | Prabhu |
| 2010/0319355 A1 | 12/2010 | Prabhu |
| 2011/0067407 A1 | 3/2011 | Berdou et al. |
| 2011/0212010 A1 | 9/2011 | Bell |
| 2011/0219780 A1 | 9/2011 | Prabhu |
| 2012/0141343 A1 | 6/2012 | Shiban |
| 2012/0167552 A1 | 7/2012 | Mori et al. |
| 2013/0104563 A1 | 5/2013 | Oelfke et al. |
| 2013/0111913 A1 | 5/2013 | Hamrin et al. |
| 2013/0111920 A1 | 5/2013 | Hamrin et al. |
| 2013/0232874 A1 | 9/2013 | Maslov |
| 2013/0232876 A1 | 9/2013 | Armstrong et al. |
| 2013/0232939 A1 | 9/2013 | Armstrong et al. |
| 2013/0232940 A1 | 9/2013 | Armstrong |
| 2013/0232942 A1 | 9/2013 | Watts |
| 2013/0232943 A1 | 9/2013 | Lampe et al. |
| 2013/0232944 A1 | 9/2013 | Lampe et al. |
| 2013/0232945 A1 | 9/2013 | Armstrong et al. |
| 2013/0232946 A1 | 9/2013 | Hamrin et al. |
| 2013/0232947 A1 | 9/2013 | Armstrong et al. |
| 2013/0232982 A1 | 9/2013 | Maslov |
| 2013/0232983 A1 | 9/2013 | Maslov |
| 2013/0232984 A1 | 9/2013 | Lampe et al. |
| 2013/0232985 A1 | 9/2013 | Hamrin et al. |
| 2013/0233213 A1 | 9/2013 | Martin et al. |
| 2013/0236369 A1 | 9/2013 | Maslov et al. |
| 2013/0236370 A1 | 9/2013 | Maslov |
| 2013/0236371 A1 | 9/2013 | Maslov |
| 2013/0236372 A1 | 9/2013 | Denison et al. |
| 2013/0236839 A1 | 9/2013 | Lampe et al. |
| 2013/0236841 A1 | 9/2013 | Armstrong et al. |
| 2013/0236845 A1 | 9/2013 | Hamrin et al. |

FOREIGN PATENT DOCUMENTS

| | | |
|---|---|---|
| GB | 2080934 A | 2/1982 |
| JP | 11-13483 | 1/1999 |
| WO | WO-92/20963 A1 | 11/1992 |
| WO | WO-96/14370 A2 | 5/1996 |
| WO | WO-01/92702 | 12/2001 |

OTHER PUBLICATIONS

Gutmark, Abstract Submitted for the DFD06 Meeting of the American Physical Society, Electronic form version 1.4, <http://absimage.aps.org/image/DFD06/MWS_DFD06-2006-000152.pdf>, Jul. 26, 2006.

"Flameless Thermal Oxidizers" <http://www.selasfluid.com/international/web/le/us/likelesfus.nsf/docbyalias/flameless_thermal>, Copyright 2008, 3 pages, retrieved May 13, 2010.

Stadler, H. "Experimental and Numerical Investigation of Flameless Pulverised Coal Combustion" <http://darwin.bth.rwth-aachen.de/opus3/voltexte/2010/pdf/3323.pdf>, Aug. 2010, retrieved Sep. 14, 2011.

U.S. Appl. No. 14/221,216, filed Mar. 20, 2014.

* cited by examiner

FUEL OXIDATION IN A GAS TURBINE SYSTEM

CROSS-REFERENCE TO RELATED APPLICATIONS

This application is a continuation of U.S. application Ser. No. 12/050,734, filed Mar. 18, 2008, which claims the benefit of provisional application Ser. No. 61/007,917 entitled "Gradual Oxidizer for a Gas Turbine," filed Oct. 23, 2007, the contents of each of which are hereby incorporated by reference herein.

BACKGROUND

This disclosure relates to oxidizing fuel in a gas turbine system. In a conventional gas turbine system, fuel is combusted as it is injected into pressurized air, thereby heating and increasing the energy of the gas. The energy is then extracted from the heated gas with a turbine which converts the energy into kinetic energy. The kinetic energy may be used to drive another device, for example, a generator. The combustion process is often initiated by an ignition source (e.g. an open flame). Due to the high temperature of the ignition source and the high concentration of the fuel as it enters the air, the combustion is very rapid and nearly instantaneous. Other gas turbine systems may additionally or alternatively utilize catalyst materials (e.g. platinum) to combust the fuel. While combustion in such catalytic combustion systems can be less rapid than that initiated by an ignition source, it is nonetheless rapid (e.g. less than 0.1 second).

SUMMARY

A mixture of air and fuel is received into a reaction chamber of a gas turbine system. The fuel is oxidized in the reaction chamber, and a maximum temperature of the mixture in the reaction chamber is controlled to be substantially at or below an inlet temperature of a turbine of the gas turbine system. The oxidation of the fuel is initiated by raising the temperature of the mixture to or above an auto-ignition temperature of the fuel. The reaction chamber may be provided without a fuel oxidation catalyst material.

In some embodiments, one or more of the following features may be included. The mixture of air and fuel can be pressurized in a compressor of the gas turbine system. The mixture can be a substantially homogeneous mixture of fuel and air. The mixture can have a fuel concentration that is below a sustainable-combustion threshold concentration.

The mixture can be heated, for example, by a heat exchanger, before the mixture is received into the reaction chamber. The heat exchanger can be in communication with the reaction chamber and the outlet of the compressor. Some or all of the heat energy imparted to the mixture in the heat exchanger can be received from the turbine exhaust gas. A valve can control the amount of heat energy imparted to the mixture in the heat exchanger. The reaction chamber can include a flame arrestor to reduce transfer of heat energy from the reaction chamber inlet to upstream of the reaction chamber inlet. The flame arrestor may, for example, suppress or reduce transfer of heat energy from the reaction chamber to the heat exchanger.

The fuel can be oxidized in a flow path defined by the reaction chamber. The reaction chamber can include materials such as refractory material, rock, or ceramic. The reaction chamber can be configured to allow sufficient time for the fuel to oxidize substantially to completion. The flow path defined by the reaction chamber can be configured such that multiple temperatures along the flow path define a temperature gradient. The temperature gradient can generally increase from a flow path inlet temperature to a flow path outlet temperature. In some cases, the fuel is gradually oxidized substantially to completion in the reaction chamber. The gas turbine system can include multiple reaction chambers, where each reaction chamber oxidizes some or all of the fuel.

A master control system can be included for controlling one or more aspects of operation. For example, a controller and sensors may be included for detecting characteristics such as temperature, pressure, flow rate, composition of the air/fuel mixture, and energy content of the fuel. The controller can receive data from sensors and control one or more valves and/or ports of the gas turbine system. One or more control flows can be received in the reaction chamber, and adjusting the control flow can control the maximum temperature of the mixture in the reaction chamber. The control flows can be adjusted based on information detected by the sensors.

The control flow can include any of air, fuel, and non-reactive fluid. When the control flow is air and/or non-reactive fluid, adjusting the control flow can include increasing an amount of the control flow received into the reaction chamber in order to decrease the maximum temperature of the mixture. When the control flow is air and/or fuel, adjusting the control flow can include adjusting an amount of the control flow received into the reaction chamber to increase a maximum temperature of the mixture. Controlling a maximum temperature of the mixture in the reaction chamber can include adjusting one or more of a flow rate of the mixture through the reaction chamber or a composition of the mixture in the reaction chamber. The maximum temperature of the mixture in the reaction chamber can be controlled below a nitrogen oxide formation temperature.

The oxidized mixture, which can include oxidation product, air, fuel, and/or other materials, can be expanded in a turbine of the gas turbine system. The gas turbine system can include one turbine or multiple turbines, where each turbine is adapted to convert energy from the oxidized air and fuel mixture into rotational movement.

The details of one or more embodiments of these concepts are set forth in the accompanying drawings and the description below. Other features, objects, and advantages of these concepts will be apparent from the description and drawings, and from the claims.

DESCRIPTION OF DRAWINGS

Like reference symbols in the various drawings indicate like elements.

DETAILED DESCRIPTION

Figure 1:
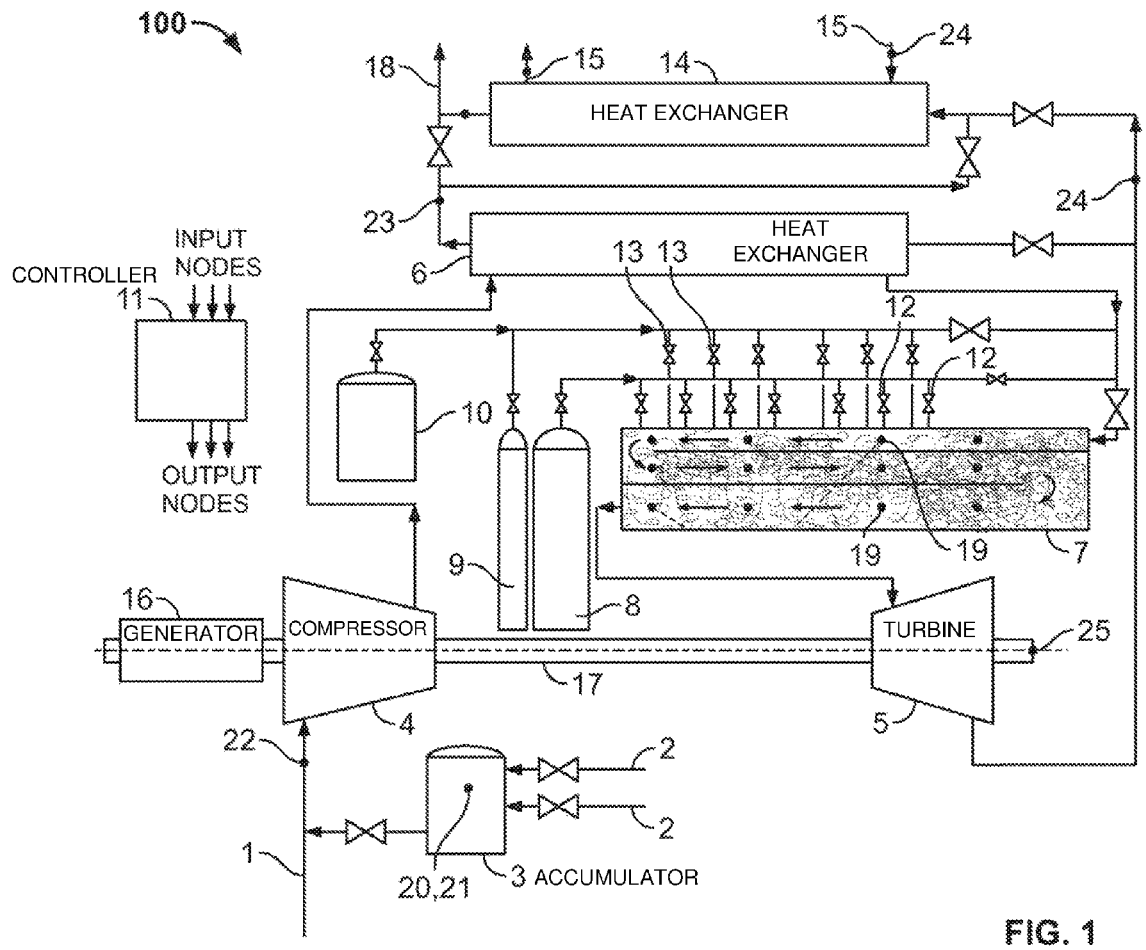
FIG. 1 is a diagram illustrating an example gas turbine system in accordance with some aspects of the present disclosure.

FIG. 1 is a diagram illustrating an example gas turbine system 100 in accordance with some aspects of the present disclosure. The system 100 gradually oxidizes fuel by heating a mixture of the fuel and air to or above the fuel's auto-ignition temperature to initiate a spontaneous oxidation reaction. Thereafter, the temperature is maintained within a temperature range selected to maintain gradual oxidation. The fuel concentration and flow rate may be additionally or alternatively controlled to maintain gradual oxidation. By gradually oxidizing fuel, the system 100 can enable enhanced control over the fuel oxidation process, complete or substantially complete oxidation of fuel constituents (thus reducing the emission of un-oxidized fuels into the environment), reduction of thermally generated environmental pollutants (e.g. nitrogen oxides), reduction or elimination of a need for expensive catalyst materials, and/or reduction of contaminants (e.g. silica) that can be harmful to gas turbine system components. Furthermore, by detecting and compensating for variations in fuel energy content and fuel composition, the system 100 can extract energy from air/fuel mixtures having weak fuel constituents (e.g. low quality methane or ethane). As an example of a weak fuel, gas emanating from landfill may contain only a small percentage of methane (e.g. 2 percent). A gas having such a low concentration of methane may be below a sustainable combustion threshold concentration, and therefore, the fuel may be too weak to sustain combustion. In fact, a spark or flame introduced to the gas, even in the presence of air, can be snuffed out by the gas. However, when the gas is raised to a temperature above the auto-ignition temperature of methane, the methane can oxidize in the presence of air without introduction of a spark or flame. The system 100 may also detect, control, and/or compensate for variations in the temperatures, flow rates, and dwell times of an air/fuel mixture in the reaction chamber 7 by using feedback from various sensors throughout the system 100.

The gas turbine system 100 includes a reaction chamber 7, an accumulator 3, a compressor 4, heat exchangers 6 and 14, a turbine 5, and a shaft 17 connecting the turbine 5 to the compressor 4. In some instances, the accumulator 3 can be omitted. In some instances, the heat exchangers 6 and 14 (which together operate as a recuperator) can be omitted. Fuel can be introduced through one or more constituent fuel streams 2 into the accumulator 3, which can blend the constituent fuels. Blending the constituent fuels and providing sufficient volume and time in the accumulator 3 can smooth out variations in the fuel content. The compressor 4 receives fuel from the accumulator 3 and air from an air stream 1 and pressurizes the resulting air/fuel mixture. In some instances, the air/fuel mixture constituents enter the compressor 4 at or near atmospheric pressure, and the air/fuel mixture leaves the compressor 4 substantially above atmospheric pressure. The concentration of fuel in the air/fuel mixture may be controlled such that the mixture has an energy density in a suitable range for operating the turbine 5 (e.g. 10 to 30 British thermal units per standard cubic foot (Btus/scf)). After exiting the compressor 4, the pressurized air/fuel mixture is then communicated to and heated by the heat exchanger 6. The heat exchanger 6 can receive heat energy from exhaust fluids, and a valve may control the amount of heat energy imparted to the air/fuel mixture. The heat exchanger 6 can communicate the heated, pressurized air/fuel mixture into the reaction chamber 7. Upon entering the reaction chamber 7, the air/fuel mixture may be a homogeneous mixture, where the fuel is substantially uniformly distributed through the mixture. In some implementations, the system 100 includes a flame arrestor near a reaction chamber inlet. The flame arrestor is made of heat-absorbing material to suppress transfer of heat energy from the reaction chamber 7, thereby confining the oxidation reaction to the reaction chamber 7.

The reaction chamber 7 may be a large flow chamber and may include a flow path lined with insulating refractory material. The volume and shape of the chamber can be designed to provide a low flow rate through the chamber, allowing sufficient time for fuel oxidation reactions to be completed. The air and fuel mixture flow path can be sufficiently long that a flow rate of the air and fuel mixture along the flow path, averaged over the length of the flow path, allows the fuel to oxidize substantially to completion. As an example, if the chamber is designed such that the average fluid flow rate is less than ten feet per second and the length of the chamber is ten feet, then the average dwell time of the gas in the chamber can be at least one second. High temperature heat-absorbing and/or heat-resistant material, such as ceramic or rock, may be provided in the reaction chamber 7. The material in the reaction chamber 7 can provide a thermal mass that facilitates slow oxidation of weak fuels flowing through the flow path of the reaction chamber 7. The thermal mass of the reaction chamber 7 may help stabilize temperatures for gradual oxidation of the fuel. In some cases (e.g. when there is an oversupply of fuel in the reaction chamber), the thermal mass of the reaction chamber 7 may act as a dampener, absorbing some heat and protecting the turbine. In other cases (e.g. when there is a low supply of fuel in the reaction chamber), the thermal mass of the reaction chamber 7 may provide a temporary source of energy, which may help sustain oxidation of the fuel.

The reaction chamber 7 may be designed such that under a range of operating conditions (e.g. at maximum flow rate and fuel concentration), sufficient time and temperature are provided to allow some or all of the fuels in the air/fuel mixture to gradually oxidize to completion. The reaction chamber 7 may also be adapted to promote mixing and/or oxidation of materials in the flow path. For example, the reaction chamber 7 may include flow diverters to control a dwell time (e.g. an amount of time a given volume of the air/fuel mixture traverses the flow path through the reaction chamber 7) and/or to help maintain a reaction chamber inlet temperature at or near a specified temperature (e.g. an auto-ignition temperature of the fuel or an operator-specified or computed inlet temperature). As another example, the reaction chamber 7 may include internal heat transfer zones, where a hotter section of the flow path imparts heat to a cooler section of the flow path. The reaction chamber 7 may also include one or more sensors 19 for detecting properties such as temperature, pressure, flow rate, or other properties relevant to the startup and/or operation of the gas turbine system 100. During operation of the example reaction chamber 7, the temperature of the reaction chamber 7 sustains the oxidation reaction. A heat source heats the reaction chamber to achieve the appropriate temperature. A heat source can include an electric heater, a gas burner, another reaction chamber and/or others.

After the fuel has oxidized in the reaction chamber 7, the oxidation product may exit the reaction chamber 7 and impart mechanical (e.g. rotational) energy to the turbine 5. From the turbine 5, the oxidation product may impart heat energy to the heat exchangers 6 and/or 14 and then exit the system 100 (e.g. into the atmosphere). Rotation of the turbine 5 may provide power to the compressor 4 and/or an operational element, such as a generator 16. In some implementations, the system 100 includes multiple reaction chambers 7, and each reaction chamber selectively oxidizes at least a portion of the fuel. In some implementations, the system 100 includes multiple turbines 5, and each turbine 5 selectively converts energy from the oxidized air and fuel mixture into rotational movement.

Figure 2:
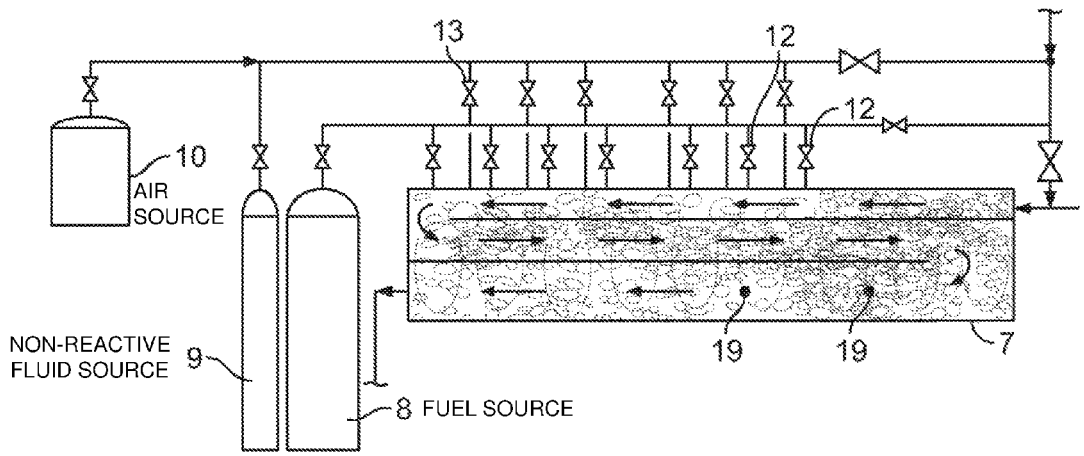
FIG. 2 is a diagram illustrating an example system for oxidizing fuel in accordance with some aspects of the present disclosure.

As illustrated in FIGS. 1 and 2, a supplemental fuel source 8, a non-reactive fluid source 9, and an air source 10 may supply fuel, non-reactive fluid (e.g. carbon dioxide, water or steam), and air, respectively, into the flow path of the reaction chamber 7 through the ports 12 and 13 for start-up and/or for controlling the oxidation of fuel. The fluids (i.e. fuel, non-reactive fluid, air) may be pumped in or stored in pressurized cylinders or tanks and may be introduced into the reaction chamber 7 as one or more control flows. In some instances, the fuel source 8 may provide a fuel that is of a higher energy density than the fuel supplied through fuel streams 2. The gas turbine system 100 may also include a controller 11 and sensors 15, 19, 20, 21, 22, 23, 24. The controller 11 and the sensors may be part of a master control system that monitors temperatures, pressures, fuel compositions, fuel energy densities, heat transfer, and other parameters relevant to operation of the system 100. Dots along the flow path (e.g. at sensors 15, 19, 20, 21, 22, 23, and 24) illustrate possible sensor locations. For example, the sensors can measure temperature, flow rate, pressure, fuel composition, and/or fuel energy density. Dotted lines in FIG. 1 illustrate example electronic connections in the master control system (e.g. connections between the controller 11 and the various valves, ports, and sensors in the system 100).

The controller 11 may be, for example, a programmable logic controller with multiple input nodes, output nodes, a memory, and a processor. The controller 11 may include programs, instructions, and/or software encoded in media for controlling one or more aspects of operation of the system 100. The input nodes may, for example, receive signals from one or more of the sensors. The output nodes may, for example, send control signals to one or more control valves at the ports 12 and 13. The control signals may include instructions to increase or decrease one or more of the control flows into the flow path of the reaction chamber.

The reaction chamber 7 may gradually oxidize the fuel to substantial completion by a reaction initiated primarily via heat energy without use of, or relying secondarily on, a catalyst material or an ignition source. For example, the reaction chamber 7 may initiate an oxidation reaction by heating the air/fuel mixture to or above the auto-ignition temperature of some or all of the constituent fuels. In some instances, the air/fuel mixture may enter the reaction chamber 7 below the auto-ignition temperature of the fuel constituents. After entering the reaction chamber 7 (e.g. through a flow path inlet), the fuel may be raised to its auto-ignition temperature through heat transfer from hotter gas downstream, and thereby begin to oxidize. As the fuel oxidizes and flows through the reaction chamber 7, the exothermic nature of the oxidation causes the temperature of the mixture to increase. Exiting the reaction chamber 7 (e.g. through a flow path outlet), oxidation product gases may be at or near the inlet temperature of the turbine 5. In some implementations, the reaction chamber 7 oxidizes at least a majority of the fuel at or below the inlet temperature of the turbine 5 (i.e. the temperature or range of temperatures at which the turbine 5 operates). In other instances, a smaller fraction of the fuel may be oxidized, allowing for further oxidation later, should that be desirable.

In some implementations, the formation of nitrogen oxides can be reduced by maintaining the maximum temperature of all points along the flow path below a temperature that can cause the formation of nitrogen oxides. For example, when no catalyst is present, nitrogen oxides can form at a temperature of 1300 degrees Celsius (C.), or another temperature. The temperature along the flow path through the reaction chamber 7 may define a temperature gradient that increases from the flow path inlet to the flow path outlet. In some implementations, the temperature along the flow path increases steadily (e.g. linearly or in discrete stages) along the path from the flow path inlet temperature to the flow path outlet temperature. In other implementations, the temperature along the flow path (toward the flow path outlet from the flow path inlet) increases less steadily, and there may be sections along the flow path in which the temperature decreases, stays substantially steady, and/or changes sharply. The flow path inlet temperature can be less than, equal to, or greater than the auto-ignition temperature of some or all of the fuels in the air/fuel mixture. In some implementations, when methane or another fuel is used, the inlet temperature is below the auto-ignition temperature of the fuel (e.g., 537 C for methane fuel). In other implementations, when methane or another fuel is used, the inlet temperature is at or slightly above the auto-ignition temperature of the fuel. The flow path outlet temperature, and/or the maximum flow path temperature, can be at or near an inlet temperature of the turbine 5. In some implementations, the flow path outlet temperature, and/or the maximum flow path temperature, is configured to be at or near an inlet temperature of the turbine 5.

Figure 3:
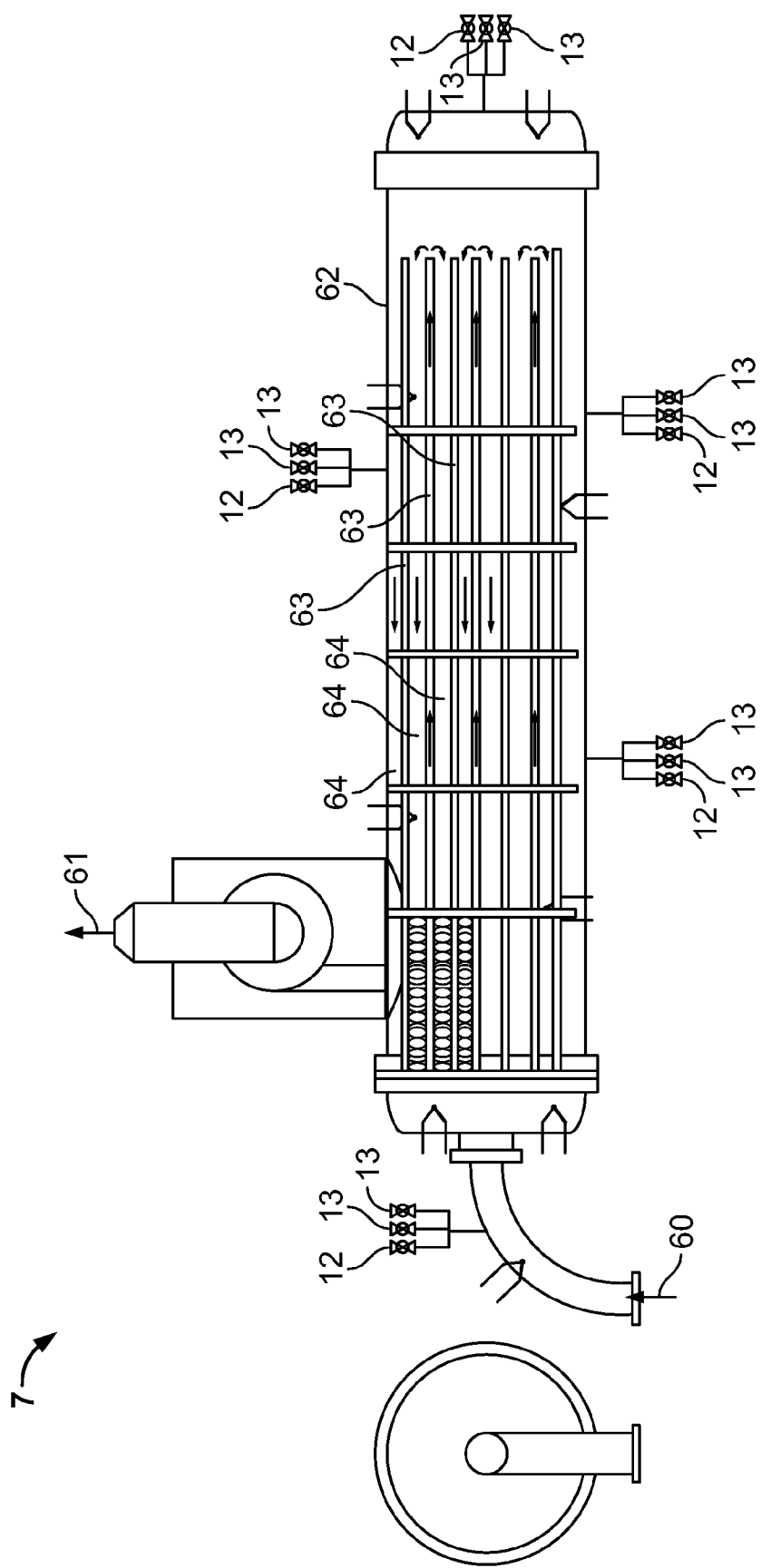
FIG. 3 is a diagram illustrating an example reaction chamber in accordance with some aspects of the present disclosure.

FIG. 3 is a diagram illustrating an example reaction chamber 7. The reaction chamber 7 includes an inlet 60, a body 62, and an outlet 61. The body 62 defines a flow path between the inlet 60 and the outlet 61. The inlet 60 may be in fluid communication with the heat exchanger 6 of FIG. 1. The outlet 61 may be in fluid communication with the turbine 5 of FIG. 1. An air/fuel mixture can enter the inlet 60 and flow along a first flow path 63 though the body 62. Upon reaching the end of the flow path 63, the air/fuel mixture can flow along a second flow path 64. While flowing through the flow paths 63 and 64 some or all of the fuel may be oxidized, and the oxidation product, along with any unoxidized portion of the air/fuel mixture, can exit the reaction chamber 7 through the outlet 61.

The second flow path 64 may include insulating refractory material, high temperature heat-absorbing material, and/or heat-resistant material, such as ceramic or rock. While flowing along the flow path 64, the fuel may be oxidized as the air/fuel mixture is heated above the fuel's auto-ignition temperature. As the fuel is oxidized, the fuel may impart heat to the materials defining the flow path 64. Heat energy from the oxidation reaction may also be transferred to the surfaces defining the flow path 63. In this manner, the air/fuel mixture flowing along the flow paths 63 may acquire heat energy from the oxidation of fuel flowing along the flow path 64. In some implementations, the temperature of the air/fuel mixture may increase steadily while flowing along the flow paths 63 and 64, reaching the auto-ignition temperature of the fuel while flowing along the flow path 64.

Figure 4:
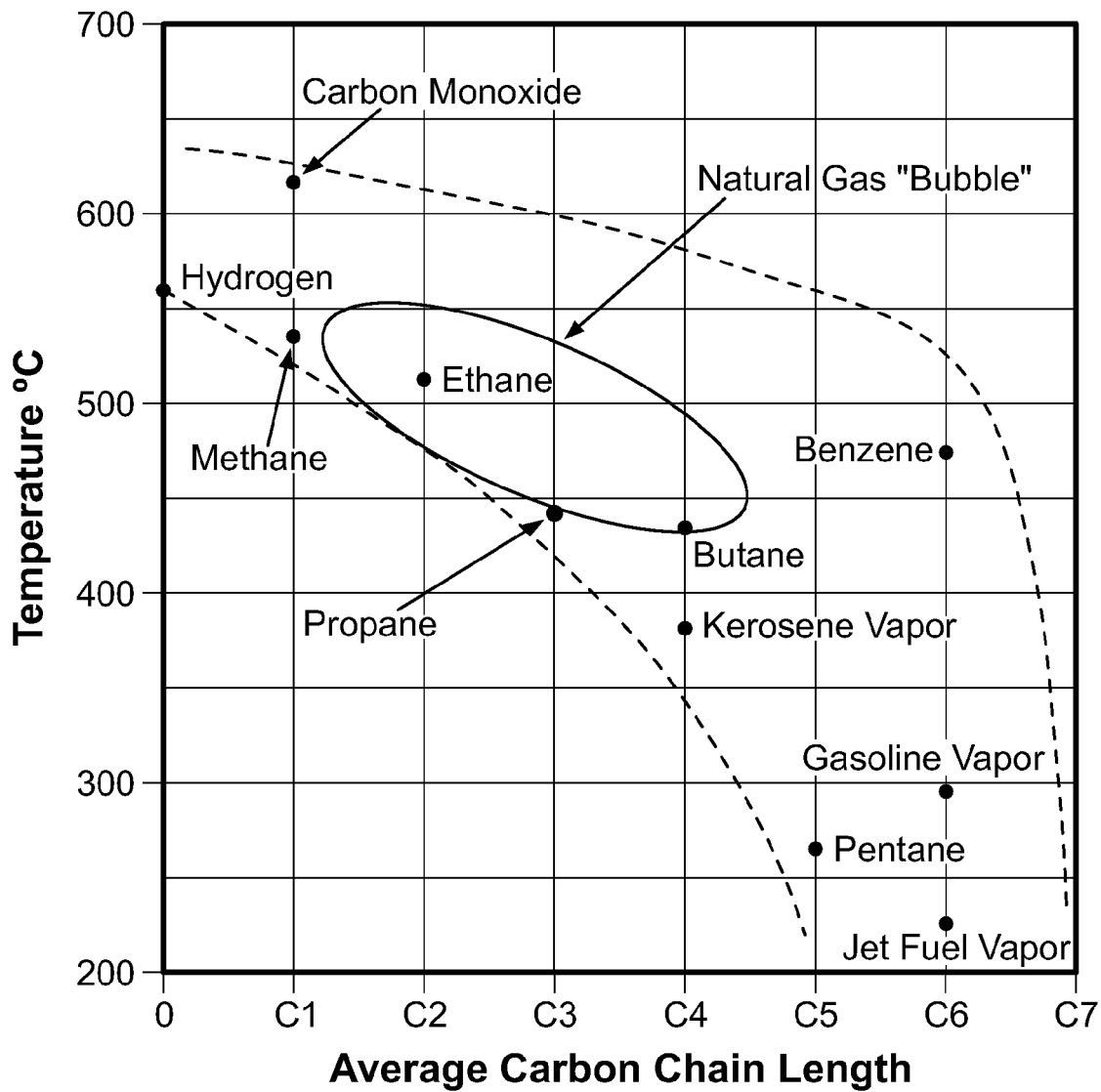
FIG. 4 is a diagram plotting auto-ignition temperatures of example fuels.

FIG. 4 is a plot showing auto-ignition temperatures for a range of example fuels, including hydrocarbon fuels, hydrogen, and carbon monoxide. The auto-ignition temperatures identified in FIG. 4 may be minimum auto-ignition temperatures for the example fuels. The highest auto-ignition temperatures identified in FIG. 4 (in the range of 537 to 630 C) are for carbon monoxide, hydrogen, and methane. The lowest auto-ignition temperatures identified in FIG. 4 (in the range of 200 to 300 C) are for vapors of gasoline, jet fuel, and pentane.

An example implementation of the gas turbine system 100 utilizes methane fuel, but the system 100 may operate using any of the gases and vapors identified in FIG. 3 as well as other types of gases and vapors. Methane has an auto-ignition temperature of 537 C. If an air/fuel mixture containing methane and sufficient oxygen is elevated to a temperature of 537 C or greater, the methane may oxidize to carbon dioxide. Providing a longer time for the oxidation process to occur may allow the fuel to oxidize more completely. In some implementations, a fuel may oxidize completely or substantially to completion in the reaction chamber 7. For example, over 99 percent of the gas may be oxidized in the reaction chamber 7. Once oxidation is initiated, the gas temperature increases, causing the oxidation rate to increase, thus the time required for complete oxidation of the fuel may correspondingly decrease.

If a fuel stays at its auto-ignition temperature, oxidation may occur more slowly than it would occur at higher temperatures. On the other hand, if a fuel is subjected to temperatures substantially higher than the fuel's auto-ignition temperature, the oxidation rate may increase too much, causing a rapid or almost instantaneous oxidation process that is difficult to control. The reaction chamber 7 can provide controlled conditions for the gradual oxidation of the fuels. As an example, a single reaction chamber 7 could be used to oxidize fuels with low heating value, fuels with very high heating value, and even liquid fuels that are vaporized prior to mixing with air. In some implementations, using a fuel (e.g., liquid fuel) that has a higher heating value reduces the quantity of fuel consumed. The reaction chamber may tolerate the presence or prevent formation of certain contaminants as well. As an example, siloxanes (which may oxidize to silica) may be found in methane produced at landfills and water treatment plants. In the reaction chamber 7, time may be provided for the silica formed by oxidation of siloxanes to deposit in the reaction chamber 7 (e.g. on a ceramic or rock bed), which may reduce or eliminate deposition of silica on other components of the system 100. Alternatively or additionally, some or all silica that forms may be removed prior to reaching the turbine using a cyclone or other separator. As another example, a slow oxidation process at or near a fuel's auto-ignition temperature may control or eliminate thermally generated pollutants, such as nitrogen oxides, that can form at higher temperatures.

Figure 5:
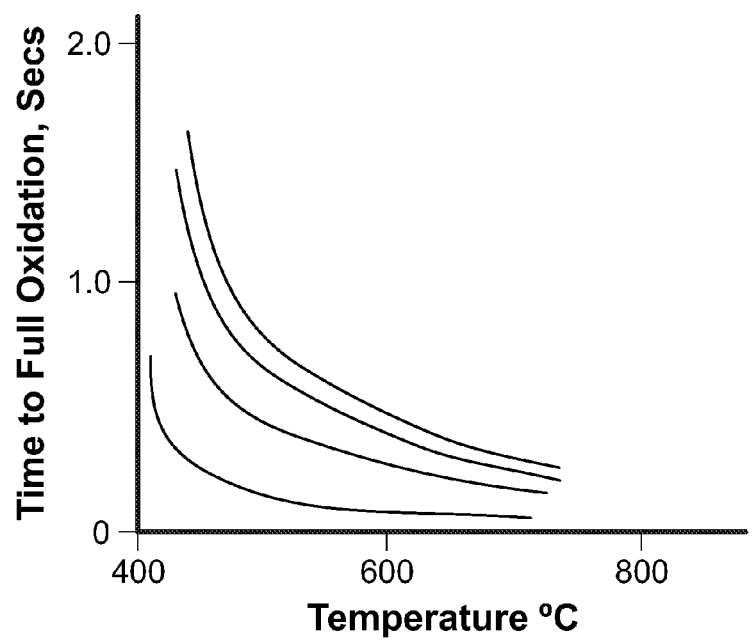
FIG. 5 is a diagram plotting example relationships between fuel temperature and time to full oxidation of the fuel.

The plots in FIG. 5 demonstrate example relationships between temperature and time to complete oxidation for different fuels. Each plot on the axes of FIG. 5 represents a different fuel or fuel constituent, and the oxidation rate of each fuel changes with temperature. An oxidation process is typically exothermic. By controlling the concentration of fuel in an air/fuel mixture, the rise in fuel temperature during oxidation (and the corresponding rise in oxidation rate) can be controlled. In some implementations, fuel oxidation (and the corresponding temperature increase) may occur at a gradual rate and sufficient time may be provided for the fuel to oxidize to completion. As seen by comparing the example plots of FIG. 5, at a given temperature, some gases may oxidize more quickly than others. When an air/fuel mixture includes several constituent fuels, each of the constituent fuels may oxidize at its own rate.

Because the system 100 mixes fuel and air, which in certain proportions may become a potentially explosive mixture, the explosive limit for each fuel may be considered in the operation of the system 100. The lower explosive limit (LEL) may refer to the minimum concentration of fuel in air that can, if ignited, cause a rapid combustion wave or explosion. For example, the LEL for most gas and vapor fuels (excluding, for example, hydrogen) in air may be in the range of 38 Btus/scf to 57 Btus/scf (1.4 to 2.0 MJ/M3). For fuels having an LEL in this range, in order to stay clear of the LEL, a fuel concentration can be maintained well below 35 Btus/scf (1.3 MJ/M3). The range of fuel concentrations used in the system 100 may be, for example, between 10 and 30 Btus per scf (0.375 and 1.125 MJ/M3), which provides an adequate margin for safe operation.

During operation and/or startup, the reaction chamber 7 may utilize the fuel source 8, the non-reactive gas source 9, the compressed air source 10, and/or the ports 12 and 13 for selectively introducing control flows (e.g. fuel, non-reactive gas, air) into the flow path of the reaction chamber 7. Control flows introduced through the ports may be used to control one or more aspects of an oxidation process in the reaction chamber 7. For example, introducing materials into the flow path may accomplish one or more of adjusting a flow rate of the air/fuel mixture along the flow path; adjusting a fuel concentration of one or more of the fuels in the air/fuel mixture; introducing one or more fuels to increase a temperature of the air/fuel mixture in the flow path; introducing air to decrease the temperature of the air/fuel mixture in the flow path; introducing one or more non-reactive fluids (e.g. carbon dioxide or steam) to decrease the temperature of the air/fuel mixture in the flow path; introducing water to rapidly reduce the temperature of the air/fuel mixture as the water evaporates; introducing air and/or non-reactive fluids to decrease a rate of increase of the temperature of the mixture; and/or introducing fuel directly into the reaction chamber as part of a startup process.

One or more control flows from the fuel source 8 may be used for start-up purposes and/or to increase the temperature of a segment of the reaction chamber 7 flow path should it drop below a desired or a minimum acceptable temperature. During start-up, control fuel may be delivered from the fuel source 8 into a flow path of the reaction chamber 7 through one or more of the ports 12. The control fuel may be combusted by an ignition source (e.g. ignition by a spark plug upon entry into the air stream) in order to heat the reaction chamber 7. The control flow from the fuel source 8 may be shut off once the reaction chamber 7 reaches a specified temperature (e.g. an operational temperature or an operator-specified temperature).

One or more control flows from the fuel source 8 may additionally or alternatively be used (e.g. occasionally) during operation of the reaction chamber 7 (i.e. after start-up) to increase the temperature of one or more segments of the reaction chamber flow path. In this phase of operation (i.e. after start-up), the control fuel may be oxidized without the use of an ignition source (e.g. spark plug or flame) because the temperatures of the reaction chamber flow path may be adequate for auto-ignition of the control fuel.

A control flow from the air source 10 may be used (e.g. occasionally) to cool a segment of the reaction chamber flow path by introducing control air selectively through valves 13. Similarly, a control flow from the non-reactive fluid source 9 may be used (e.g. occasionally or in an emergency situation) to suppress oxidation should there be an oversupply of fuel (e.g. an inadvertent oversupply of fuel). Non-reactive gas may be introduced through ports 13 along the reaction chamber flow path.

During operation and/or startup, the control system may monitor various properties at multiple points in the system 100, such as a compressor inlet temperature (e.g. at sensor 22), a compressor outlet temperature, a reaction chamber inlet temperature, a reaction chamber flow path temperature (e.g. at sensors 19), a turbine inlet temperature, a turbine temperature, a heat exchanger inlet temperature, a heat exchanger outlet temperature, and/or others. The control system may also monitor and control the generator 16 and other power generation-related equipment.

The sensors may also provide information related to the state of the reaction chamber 7 and/or on the overall performance of the system 100. Temperature sensors 19 may be located within the reaction chamber 7 (e.g. at various positions along the reaction chamber flow path). Sensors 20 and 21 can measure a temperature and a fuel energy content of fuel in the accumulator 3. Sensor 22 can measure the temperature of the mixture entering the compressor 4. Sensor 22 (or a different sensor in the same position) can measure the energy content of the mixture. Temperature sensors 23 and 24 can measure various aspects of turbine exhaust gas utilization.

In some implementations, starting up the system 100 may involve running the system 100 through several temperature, pressure and flow transients. During start-up, the generator 16 may be used for "motoring" the turbine 5 and compressor 4 (e.g. at low speeds), thereby providing air that can be used for start-up. Alternatively, air supply 10 could provide the oxygen used during startup. Once the oxidizer reaches an appropriate temperature (e.g. an auto-ignition temperature of a fuel), fuel can be introduced into the reaction chamber via the accumulator 3, and the turbine 5 can begin to power the generator. The generator can then deliver electric power to components of the system 100 (e.g. sensors and the controller 11). The gradual oxidation process in the reaction chamber 7 may cause the temperature of the air/fuel mixture to rise gradually as the mixture travels through the reaction chamber 7. The reaction chamber 7 may be large enough to provide sufficient time (e.g. 0.5 to 1.0 seconds) for the fuel to fully oxidize.

In some implementations, for example when balance between flow, temperature and power is achieved, the system 100 may be self-sustaining (e.g. needing no supplemental fuel, non-reactive fluid, or air). In such an implementation, oxidation of the air/fuel mixture flowing into the reaction chamber 7 from the heat exchanger 6 may generate sufficient heat to maintain a temperature in the reaction chamber 7 that sustains the oxidation process. Furthermore, oxidation in the reaction chamber 7 can be carefully controlled, allowing complete or substantially complete oxidation of hydrocarbons and any volatile organic compounds or carbon monoxide. Furthermore, the system 100 may be capable of safe shutdown and may be configured to handle excursions in pressure, flow and concentration.

Figure 6:
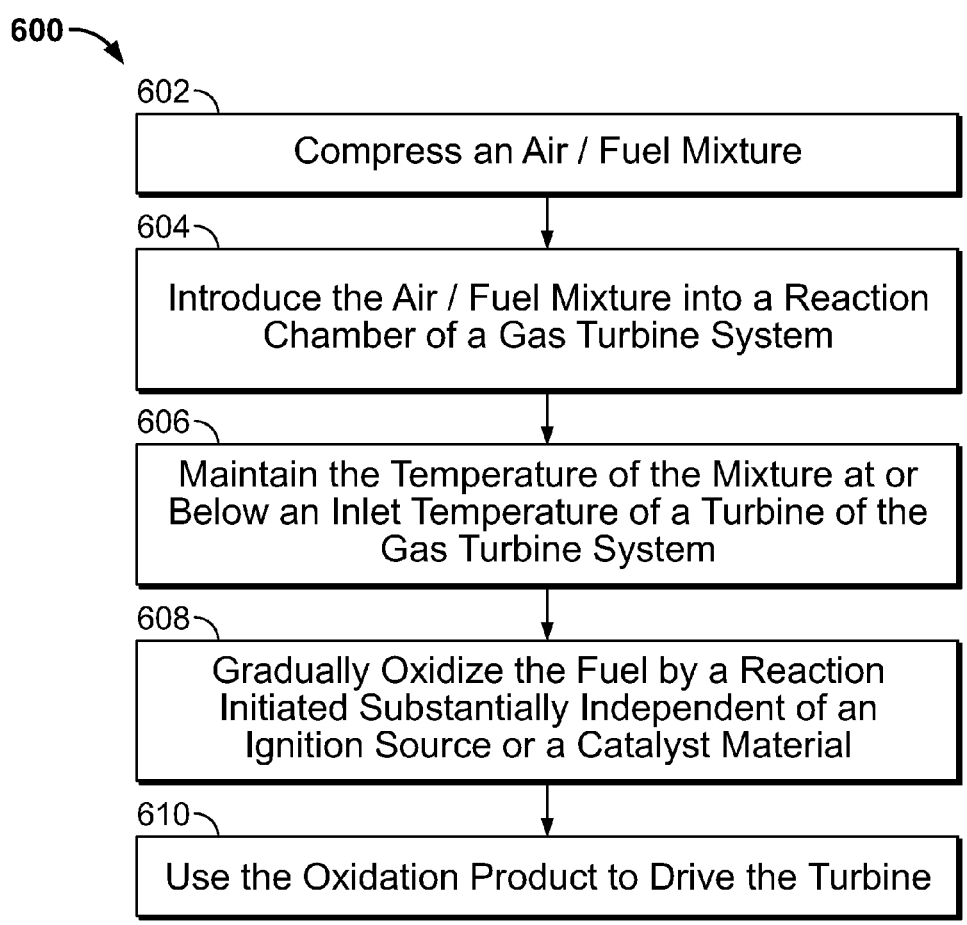
FIG. 6 is a flow chart illustrating an example process for oxidizing fuel in accordance with some aspects of the present disclosure.

FIG. 6 is a flow chart illustrating an example process 600 for oxidizing fuel in accordance with some aspects of the present disclosure. The process 600 may be used to oxidize one or more fuels or fuel mixtures gradually and/or substantially to completion in a gas turbine system, such as the gas turbine system 100 of FIG. 1. The process 600 may be useful for reducing the emission of thermally generated environmental pollutants (e.g. nitrogen oxides), reducing the formation of contaminants (e.g. silica) that can be harmful to components of a gas turbine system, and/or oxidizing fuels more completely. The process 600 may include additional or fewer operations in a variety of implementations. For example, the operations may be performed in different locations and/or in a different order.

At 602, an air/fuel mixture is pressurized in a gas turbine system. The gas turbine system may include an accumulator that provides a mixing chamber for incoming fuel and thus reduces fuel variability and associated rapid changes in fuel strength. The gas turbine system can include a compressor having an air and fuel mixture inlet and an outlet. The compressor can be adapted to compress the air and fuel mixture between the inlet and the outlet. The gas turbine system can include a reaction chamber in communication with the outlet of the compressor so that the compressed air and fuel mixture can be received in to the reaction chamber. The gas turbine system can include a turbine having an inlet in communication with the reaction chamber and adapted to convert energy from the oxidized air and fuel mixture into rotational movement.

The gas turbine system can include one or more sensors for detecting a temperature and/or a flow rate at one or more positions along a flow path through the reaction chamber. The gas turbine system can include a controller for receiving data from the sensors and for controlling a flow rate of the mixture and/or a temperature of the mixture along the flow path. The reaction chamber can include ports along the flow path, where each port is adapted to introduce at least one of air, fuel, or non-reactive fluid into the flow path. The reaction chamber can be provided substantially without a fuel oxidation catalyst material.

In some implementations, the fuel may include multiple constituent fuels. One or more of the fuels may be a weak fuel (e.g. methane). The air/fuel mixture may be a homogeneous mixture, where the fuel is substantially uniformly distributed through the mixture. In some implementations, the air/fuel mixture includes a low concentration of fuel that may not combust when exposed to an ignition source (e.g. a spark plug or a flame).

At 604, the mixture of air and fuel is received in the reaction chamber of the gas turbine system. The mixture may be introduced into the flow path through a flow path inlet. The flow path may be lined with refractory material, rock, ceramic, and/or another material having a high thermal mass.

At 606, the temperature of the mixture is maintained at or below an inlet temperature of a turbine of the gas turbine system. The temperature of the mixture may be maintained by controlling a flow rate of the mixture along the flow path of the reaction chamber. The high thermal mass material in the flow path may help maintain proper temperatures (e.g. a temperature gradient) along the flow path. For example, the refractory material may dampen time-fluctuations in temperature in the flow path. In some implementations, multiple temperatures along the flow path define a temperature gradient, and the temperature gradient generally increases from a flow path inlet temperature to a flow path outlet temperature. The inlet temperature of the turbine can, in some implementations, be a maximum temperature of the turbine, above, at, or below a manufacturer suggested temperature of the turbine.

The temperature of the mixture may be maintained by receiving one or more control flows into the flow path through valves or ports. For example, a sensor may detect a temperature of a portion of the flow path, and a controller may identify that the detected temperature is higher than a desired temperature for the portion of the flow path. The controller may send a signal to one or more ports, for example, to open a control valve, allowing air and/or nonreactive gas to enter the portion of the flow path. The air and/or non-reactive gas may cool the mixture or quench an oxidation reaction, thus lowering the temperature of the portion of the flow path. Similarly, if the controller identifies that the detected temperature is lower than a desired temperature for the portion of the flow path, fuel can be received into the flow path, which may cause an increase in temperature.

In some implementations, adjusting a control flow controls a maximum temperature of the mixture. For example, the control flow can include air and/or non-reactive gas, and adjusting the control flow can increase an amount of the control flow received into the reaction chamber to decrease a maximum temperature of the mixture. As another example, the control flow can include air and/or fuel, and adjusting the control flow can adjust an amount of the control flow received into the reaction chamber to increase a maximum temperature of the mixture. When a characteristic (e.g., a temperature at one or more positions in the reaction chamber, an energy content of the fuel, or a composition of the mixture) is detected, adjusting the control flow can include adjusting an amount of the control flow received into the reaction chamber based at least in part on the detected characteristic. Maintaining a maximum temperature of the mixture in the reaction chamber may also be accomplished by adjusting one or more of a flow rate of the mixture through the reaction chamber, a composition of the mixture in the reaction chamber, or the heat transfer to or from the mixture before or as it enters the reaction chamber. As the fuel in the reaction chamber oxidizes, the mixture in the reaction chamber may also include oxidation product, contaminants, and/or materials received from one or more control flows (e.g. air, fuel, and/or non-reactive fluids). In some implementations, the maximum temperature of the mixture, which can include all of these materials, is controlled in the reaction chamber substantially at or below an inlet temperature of a turbine of the gas turbine system.

At 608, the fuel is gradually oxidized by a reaction initiated primarily via heat energy, and in some instances substantially independent of an ignition source or a fuel oxidation catalyst material (e.g., platinum). Gradual oxidation can include oxidizing the fuel in the reaction chamber using heat energy to initiate oxidation while maintaining a maximum temperature of the mixture in the reaction chamber substantially at or below (e.g., below or slightly above) an inlet temperature of a turbine of the gas turbine system. The oxidization of the fuel can be initiated with or without employing a catalyst material. A majority of the fuel or all of the fuel may be oxidized at or below the inlet temperature of the turbine. In some implementations the fuel is oxidized to completion. In other implementations, a portion of the fuel is oxidized in the oxidation chamber and some amount of fuel is left unoxidized.

In some implementations, an ignition source or a catalyst material may be included in the reaction chamber for some aspect of operation (e.g. for startup). However, the gradual oxidation reaction may be initiated and/or sustained substantially independent of the ignition source or the catalyst material. For example, during startup, a spark plug may ignite a separate fuel introduced into the reaction chamber in order to heat gases traveling through the reaction chamber. The heated gases may in turn transfer some of their heat energy to the incoming air/fuel mixture, raising the temperature of the air/fuel mixture above the auto-ignition temperature of the fuel, thus causing the fuel in the incoming air/fuel mixture to spontaneously oxidize. As another example, there may be catalyst material included in the reaction chamber, which could be used, for example, during startup. However, the oxidation reaction (e.g. initiating and sustaining the reaction) may proceed substantially independent of the catalyst material.

At 610, the thermodynamic energy in the oxidation product drives the turbine. Driving the turbine may include expanding the oxidized fuel in a turbine of the gas turbine system and/or imparting mechanical (e.g. rotational) energy to the turbine. The turbine may drive the compressor used to pressurize the air/fuel mixture. The turbine may also drive a generator that generates electrical current.

A number of embodiments have been described. Nevertheless, it will be understood that various modifications may be made without departing from the spirit and scope of this disclosure. For example, one or more of the components of the gas turbine system 100 may be omitted. In some implementations, the gas turbine system 100 may operate without sensors, a controller, heat exchangers, a generator, and/or others. Furthermore, one or more ports may be omitted, and the system components can be arranged in a different configuration. The illustrated gas turbine system 100 is simply an example system that embodies some concepts of the present disclosure. Accordingly, other embodiments are within the scope of the following claims.

What is claimed is:

1. A method of operating a gas turbine system, comprising:
    oxidizing a fuel of an air and fuel mixture in a reaction chamber, wherein a fuel oxidation catalyst material is not used during the oxidizing; and
    controlling a maximum temperature of the air and fuel mixture to be between an auto-ignition temperature of the fuel and 1300° C. by receiving a control flow comprising supplemental fuel through a plurality of ports located at a plurality of locations along a reaction chamber flow path in the reaction chamber, each of the plurality of ports being connected to a supplemental fuel source for introduction of the supplemental fuel into the reaction chamber through the plurality of ports.

2. The method of claim 1, wherein the air and fuel mixture is a mixture of air and one or more of oxidizable gas, oxidizable vapor, or oxidizable particles.

3. The method of claim 1, wherein the reaction chamber defines an air and fuel mixture flow path of sufficient duration that a flow rate of the air and fuel mixture along the air and fuel mixture flow path provides sufficient time for the fuel to oxidize to completion.

4. The method of claim 1, further comprising heating the air and fuel mixture before oxidizing the fuel in the reaction chamber.

5. The method of claim 1, wherein the control flow further comprises air, and controlling the maximum temperature of the air and fuel mixture comprises increasing an amount of the control flow received into the reaction chamber to decrease the maximum temperature of the air and fuel mixture.

6. The method of claim 1, wherein the control flow further comprises a non-reactive fluid, and controlling the maximum temperature of the air and fuel mixture comprises increasing an amount of the control flow received into the reaction chamber to decrease the maximum temperature of the air and fuel mixture.

7. The method of claim 1, wherein oxidizing the fuel comprises gradually oxidizing a majority of the fuel.

8. The method of claim 1, further comprising
detecting a characteristic comprising a temperature at one or more positions in the reaction chamber; and
adjusting an amount of the control flow received into the reaction chamber based at least in part on the characteristic.

9. A method of operating a gas turbine system, the method comprising:
oxidizing a fuel of an air and fuel mixture in a reaction chamber of the gas turbine system while controlling a maximum temperature of the air and fuel mixture in the reaction chamber to be between an auto-ignition temperature of the fuel and 1300° C., wherein a fuel oxidation catalyst material is not used during the oxidation;
receiving a control flow comprising supplemental fuel (i) from a supplemental fuel source, (ii) through a plurality of ports located at a plurality of locations along a reaction chamber flow path in the reaction chamber, and (iii) into the reaction chamber, each of the plurality of ports being spaced from another of the plurality of ports along the reaction chamber flow path; and
adjusting the control flow to control the maximum temperature of the air and fuel mixture.

10. The method of claim 9, further comprising, prior to oxidizing the fuel, pressurizing the air and fuel mixture in a compressor of the gas turbine system.

11. The method of claim 9, further comprising detecting a characteristic comprising a temperature at one or more positions in the reaction chamber; wherein adjusting the control flow comprises adjusting an amount of the control flow received into the reaction chamber based at least in part on the characteristic.

12. The method of claim 9, further comprising expanding the air and fuel mixture in a turbine of the gas turbine system.

13. The method of claim 9, wherein the air and fuel mixture comprises a fuel concentration below a sustainable-combustion threshold concentration.

14. The method of claim 9, wherein oxidizing the fuel comprises gradually oxidizing all of the fuel.

15. The method of claim 9, a plurality of temperatures along the reaction chamber flow path defines a temperature gradient, and the temperature gradient generally increases from a flow path inlet temperature to a flow path outlet temperature.

16. The method of claim 9, wherein the fuel is oxidized in the reaction chamber flow path, the method further comprising at least one of:
adjusting a flow rate of the air and fuel mixture along the reaction chamber flow path;
adjusting a fuel concentration of the air and fuel mixture;
receiving into the reaction chamber flow path air to decrease the temperature of the air and fuel mixture;
receiving into the reaction chamber flow path air to decrease a rate of increase of the temperature of the air and fuel mixture;
receiving into the reaction chamber flow path one or more non-reactive fluids to decrease a rate of increase of the temperature of the air and fuel mixture; or
receiving into the reaction chamber flow path one or more non-reactive fluids to decrease the temperature of the air and fuel mixture.

17. The method of claim 9, further comprising heating the air and fuel mixture before oxidizing the air and fuel mixture in the reaction chamber.

18. The method of claim 9, wherein the control flow further comprises air, and controlling the maximum temperature of the air and fuel mixture comprises increasing an amount of the control flow received into the reaction chamber to decrease the maximum temperature of the air and fuel mixture.

19. The method of claim 9, wherein the control flow further comprises a non-reactive fluid, and controlling the maximum temperature of the air and fuel mixture comprises increasing an amount of the control flow received into the reaction chamber to decrease the maximum temperature of the air and fuel mixture.

20. A gas turbine system comprising:
a reaction chamber adapted to oxidize a fuel of an air and fuel mixture and maintain a maximum temperature of the air and fuel mixture in the reaction chamber between an auto-ignition temperature of the fuel and 1300° C., wherein the reaction chamber is provided without a fuel oxidation catalyst material;
a plurality of ports located at a plurality of locations along a reaction chamber flow path in the reaction chamber, each of the plurality of ports being connected to a supplemental fuel source;
a controller adapted to adjust a control flow of a supplemental fuel through the plurality of ports into the reaction chamber to control the maximum temperature of the air and fuel mixture within the reaction chamber.

21. The gas turbine system of claim 20, further comprising a compressor having a compressor inlet and a compressor outlet, the compressor adapted to compress the air and fuel mixture between the compressor inlet and the compressor outlet, the compressor outlet being in communication with an inlet of the reaction chamber.

22. The gas turbine system of claim 20, further comprising a sensor adapted to detect a characteristic comprising a temperature at one or more positions in the reaction chamber, wherein the controller is adapted to adjust an amount of the control flow received into the reaction chamber based at least in part on the characteristic.

23. The gas turbine system of claim 20, further comprising a turbine in communication with the reaction chamber, the turbine adapted to convert energy from the air and fuel mixture into rotational movement.

24. The gas turbine system of claim 20, the reaction chamber comprising a reaction chamber inlet to receive the air and fuel mixture into the reaction chamber, and a flame arrestor to reduce transfer of heat energy from the reaction chamber inlet to upstream of the reaction chamber inlet.

25. The gas turbine system of claim 20, wherein each of the plurality of ports is further connected to a non-reactive fluid source and an air source for introduction of a non-reactive fluid and air into the reaction chamber through the plurality of ports.

* * * * *